July 10, 1956　　　　　　　N. C. WALKER　　　　　　2,753,811
CARGO CARRYING VEHICLES
Filed May 9, 1952　　　　　　　　　　　　　　　　3 Sheets-Sheet 3
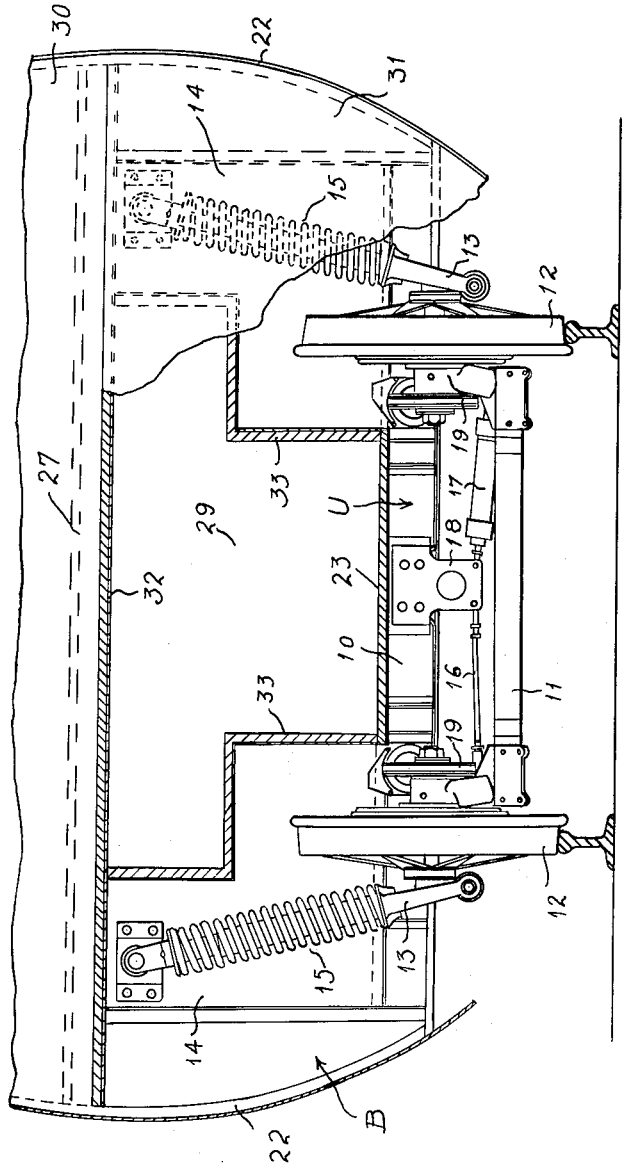
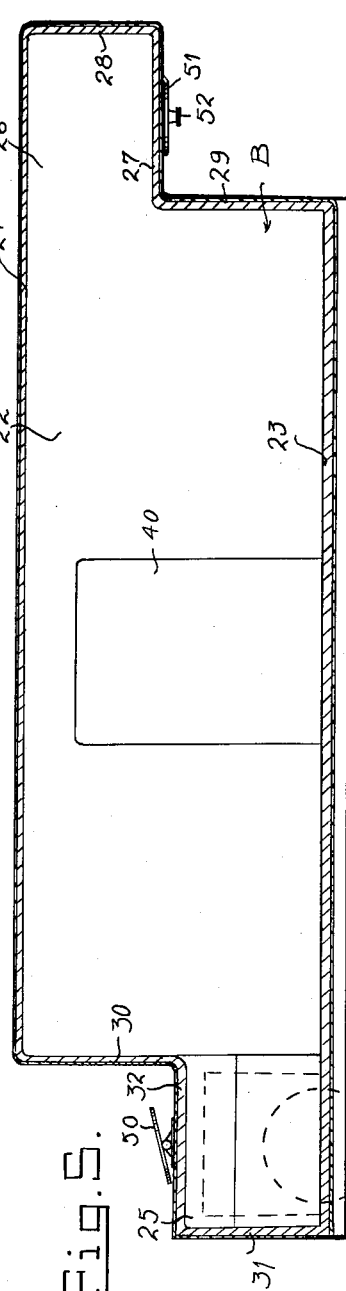
INVENTOR.
Nelson C. Walker
BY
George R. Ericson
ATTORNEY

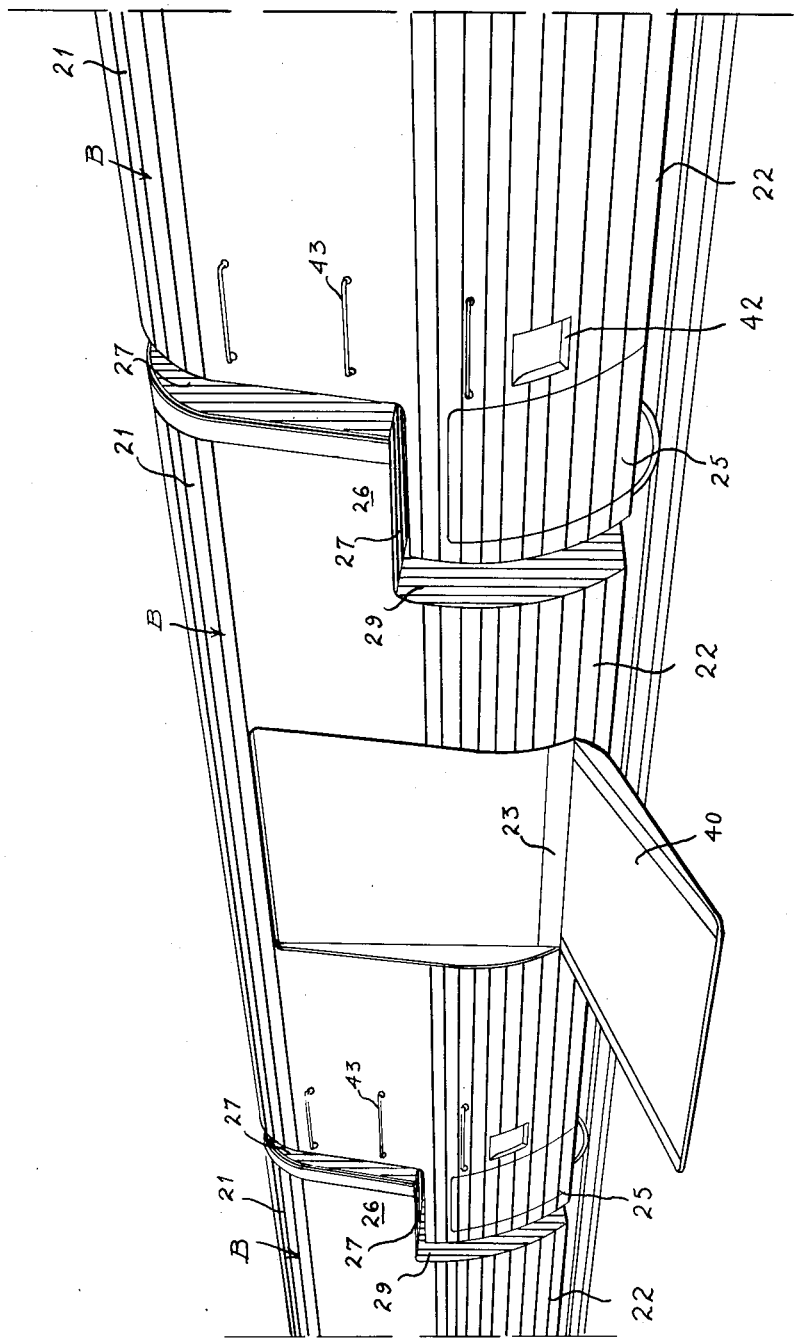

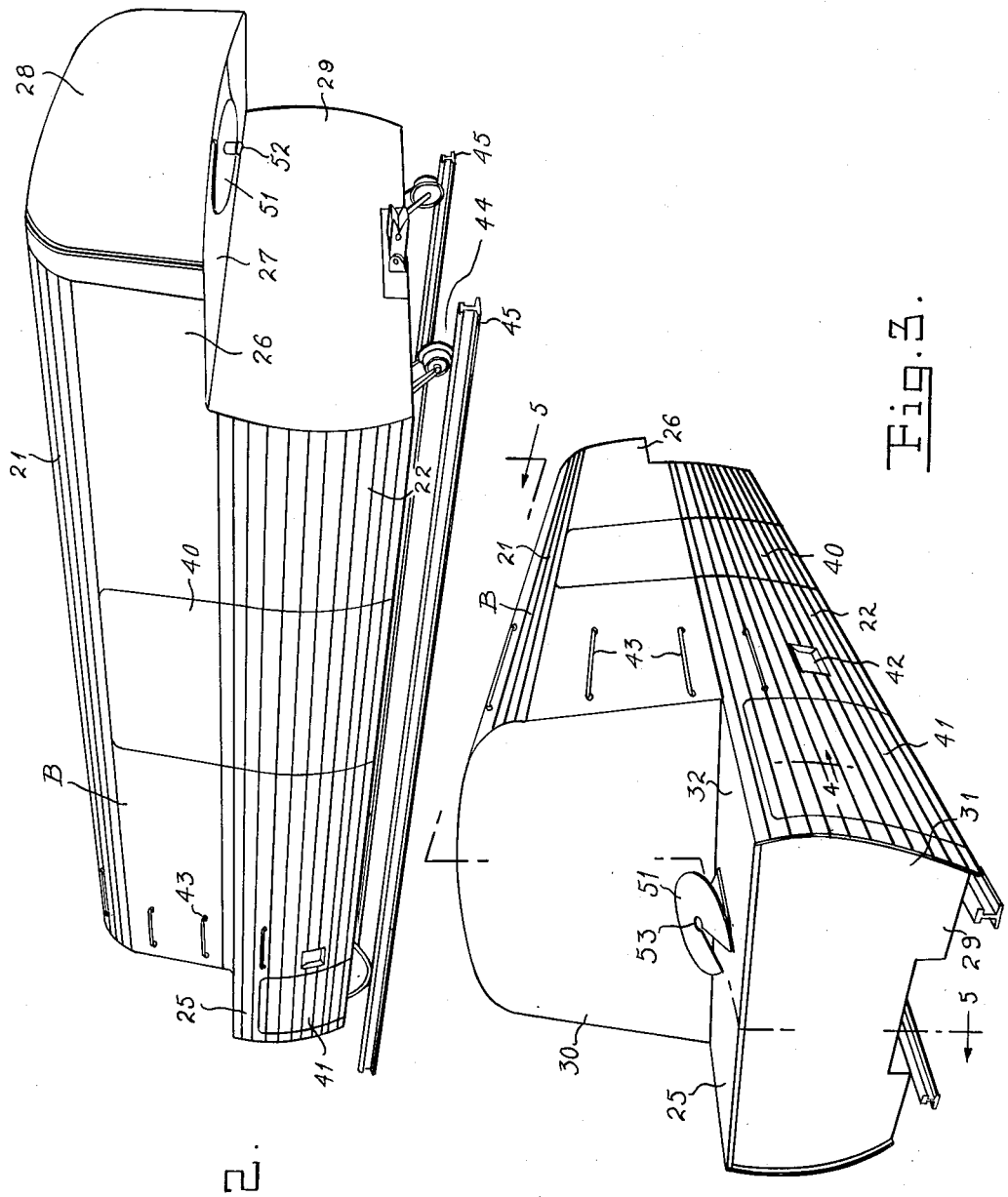

United States Patent Office 2,753,811
Patented July 10, 1956

2,753,811

CARGO CARRYING VEHICLES

Nelson C. Walker, Berwick, Pa., assignor to ACF Industries, Incorporated, a corporation of New Jersey Application May 9, 1952, Serial No. 286,896

3 Claims. (Cl. 105—4)

This invention relates to vehicles for transporting freight and more particularly to trailer vehicles for use in a train.

Trailer vehicles for hauling freight are usually provided with two rear wheels, an axle structure, spring or other suspension mechanism between the axle and body and other suitable connections between the axle and body to restrict various relative movements. In such vehicles, whether used singly with a tractor or in a train, the cargo body terminates forwardly of the wheels to provide a platform for connecting and mounting the trailing vehicle with the result that no cargo space is provided in the wheel and mounting area of the vehicles. Because of this, the load capacity of a train of vehicles is materially reduced.

An object of this invention is to increase the cargo capacity of a train of freight vehicles, either rail or road, through the provision of cars having ends formed for complementary relation when coupled together.

Another object of the invention is to provide a trailer freight vehicle structure for use in a train in which the ends of adjacent cars are formed complementary and to accommodate a draft coupling and bearing connection therebetween.

These and other objects of the invention will be apparent to those skilled in the art from a study of the following description and accompanying drawings, in which:

Figure 1 is a side perspective view of a train of trailer freight vehicles.

Figure 2 is a perspective view of the front end and a side of a trailer freight vehicle.

Figure 3 is a perspective view of the rear end and a side of the freight vehicle shown in Fig. 2.

Figure 4 is a sectional view taken approximately on line 4—4 of Fig. 3 showing the wheel and axle mounting of the trailer vehicle.

Figure 5 is a longitudinal sectional view of the vehicle taken on line 5—5 of Fig. 3.

Referring now to the drawings by characters of reference, a trailer type of freight vehicle for use in trains includes a body B and an underframe U. The underframe can be of any suitable character and at its rear end has a transverse sill 10.

To the rear of the rear sill is a drop axle structure 11 having wheels 12 mounted on the ends thereof, which wheels may be for use on either road or rails. The vehicle is supported on the axle structure by struts 13 comprising telescoping sections. The lower sections of the struts are pivotally connected to the axle ends and the upper sections are pivotally mounted to bulkheads 14 of the body. Coil springs 15 surround the struts and are anchored at their ends to the strut sections. The struts and springs support the body on the axle and allow limited vertical and tilting movement of the body relative to the axle. Side sway of the body is restricted by members 16 and 17 attached to sill plate 18 and end portions of the axle structure and radius rod structures 19 are provided between the end sill and axle. The suspension mechanism shown and described is not a part of the invention and is similar to that shown in Patent No. 2,557,354.

The vehicle bodies B are similar and have a roof 21, parallel curved side walls 22 and bottom flooring 23 with which is associated suitable framing (not shown).

The rear end of the body has a lower projecting portion 25 while the front end of the body has an upper projecting portion 26. Wall 27 closes the bottom of the upper projecting end portion of the body and wall 28 closes the front end of the projecting end portion of the body. The sides 22 and roof 21 are continued over such upper projecting end portion of the body. Wall 29 closes the front end of the body below the overhanging end portion. Wall 30 closes the rear end of the body above the lower projecting end portion and wall 31 closes the rear end of such body projecting portion. Wall 32 closes the top of the rear projecting portion of the body and the side walls 22 continue along such end portion.

Cargo can be stored in the body space above wall 27 and in a portion of the space below wall 32. Stepped walls 33 extend longitudinally below wall 32 to end wall 31 and define a central storage space in the lower projecting end portion of the car. Walls 31, 32 and 33, bulkheads 14 and side walls 22 provide spaces in which the wheels, axle and axle mounting mechanism are housed.

It will be noted that the rear and front end portions of the adjacent vehicle bodies are complementary when moved into position for coupling so that substantially the only spaces in the train of vehicles not used for cargo storage are those housing the wheels and their mounting and those between the car ends required for mounting and swiveling.

Side doors 40 are hinged at the body floor and when lowered outwardly provide ramps for cargo loading and unloading apparatus. Side panels 41 are removably attached to the side walls of the body and when removed, they uncover openings through which service can be made to the wheels, axle structure and associated mountings. The side walls also are formed with a recess 42 providing a step for trainmen and above the steps grab irons 43 are attached to the body side walls. Suitable supplemental wheels 44 for supporting the front end of the vehicle, when uncoupled, on track rails 45 are provided. These wheels are preferably mounted to be swung into a position so that they will clear the adjacent vehicle end when the vehicles are coupled.

Due to the complementary nature of the vehicle ends, their adjacent horizontal walls 27 and 32 can be utilized to carry bearing means which preferably also serves as the draft coupling. Such means is preferably in the form of a fifth wheel having a grooved plate element 50 mounted on wall 32 of the rear end and plate element 51 mounted on wall 27, the latter plate carrying a depending swivel member 52 adapted to anchor in socket 53 in plate 50. As such fifth wheel structure is well known, further details of construction are not believed to be necessary. It will be noted that plates 50 and 51 provide engaging bearing faces of sufficient size to prevent relative tilting of the vehicle ends while member 52 is anchored in the recess 53 to allow swiveling of the adjacent ends of the vehicles.

The invention may be modified in various respects as will occur to those skilled in the art and the exclusive use of all modifications as come within the scope of the appended claims is contemplated.

What is claimed is:

1. In a train, a plurality of trailer freight vehicles each comprising a closed body having a central lading carrying portion, a lower lading carrying portion projecting from one end of and communicating with the central portion and having a top wall, and an upper lading carrying portion projecting from the other end of and communicating with the central portion and having a bottom wall, said walls lying in horizontal planes intermediate the height of said central portion with the top wall lying in a plane spaced above the plane of said bottom wall, said vehicles being movable into complementary coupled relation with the lower projecting end portions underlying the upper projecting end portions of adjacent vehicles, and draft coupling elements on the adjacent top and bottom walls of said projecting end portions adapted to cooperatively interengage when the cars are in coupled relation.

2. A trailer vehicle for hauling freight comprising a central lading containing body having open upper front and lower rear ends and formed with a roof, floor and side walls; a forward lading containing body portion projecting from and communicating with the open upper front end of the central body formed with a floor in a plane above the central body floor, side walls and a roof extending as continuations of the side walls and roof of the central body, and a front end closure; a rear lading containing body portion projecting from and communicating with the open lower rear end of the central body formed with exterior side walls extending as continuations of the central body side walls, spaced-apart interior longitudinally extending walls between and spaced from the exterior side walls, a floor between the interior walls extending as a continuation of the central body floor, a top wall extending entirely across the space between the exterior side walls, and a rear end wall closing the opening bounded by the rear ends of the exterior side walls, the floor and the top wall; said exterior and interior walls forming in part wheel housings at opposite sides of said rear body portion.

3. A trailer vehicle for hauling freight including a central lading containing body having an open lower end and formed with a roof, floor and side walls; an associated lading containing body portion projecting from and communicating with said open lower end of the central body formed with exterior side walls extending as continuations of the central body side walls, spaced-apart interior longitudinally extending walls between and spaced from the exterior side walls, a floor between the interior walls extending as a continuation of the central body floor, a top wall extending entirely across the space between the exterior side walls, and an end wall closing the opening bounded by the projecting ends of the exterior side walls, the floor and the top wall; the exterior and interior walls forming in part housings for vehicle supporting wheels and body mounting mechanism at opposite sides of said rear body portion.

References Cited in the file of this patent

UNITED STATES PATENTS

| | | |
|---|---|---|
| 1,431,567 | Church | Oct. 10, 1922 |
| 1,476,148 | Church | Dec. 4, 1923 |
| 1,858,769 | Erskine | May 17, 1932 |
| 1,880,844 | Curtiss | Oct. 4, 1932 |
| 2,184,298 | Groff | Dec. 26, 1939 |
| 2,462,666 | Omar | Feb. 22, 1949 |

FOREIGN PATENTS

| | | |
|---|---|---|
| 335,490 | France | July 27, 1903 |